United States Patent
Iwasaki et al.

(10) Patent No.: US 10,560,051 B2
(45) Date of Patent: Feb. 11, 2020

(54) PHOTOVOLTAIC APPARATUS

(71) Applicant: Sumitomo Electric Industries, Ltd., Osaka-shi (JP)

(72) Inventors: Takashi Iwasaki, Osaka (JP); Yoshiya Abiko, Osaka (JP); Youichi Nagai, Osaka (JP); Makoto Inagaki, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 54 days.

(21) Appl. No.: 15/519,709

(22) PCT Filed: Oct. 1, 2015

(86) PCT No.: PCT/JP2015/077984
§ 371 (c)(1),
(2) Date: Apr. 17, 2017

(87) PCT Pub. No.: WO2016/084476
PCT Pub. Date: Jun. 2, 2016

(65) Prior Publication Data
US 2017/0250650 A1     Aug. 31, 2017

(30) Foreign Application Priority Data
Nov. 28, 2014  (JP) .................. 2014-242169

(51) Int. Cl.
*H02S 20/32* (2014.01)
*H02S 20/10* (2014.01)
(Continued)

(52) U.S. Cl.
CPC ............ *H02S 20/32* (2014.12); *F24S 30/452* (2018.05); *H02S 20/10* (2014.12); *F24S 23/31* (2018.05); *F24S 2030/18* (2018.05); *Y02E 10/47* (2013.01)

(58) Field of Classification Search
CPC ....................................................... H02S 20/32
See application file for complete search history.

(56) References Cited

U.S. PATENT DOCUMENTS

| 2010/0229852 A1* | 9/2010 | Buckley | F24J 2/055 |
| | | | 126/652 |
| 2012/0125399 A1* | 5/2012 | Schatz | F16H 25/186 |
| | | | 136/246 |

(Continued)

FOREIGN PATENT DOCUMENTS

| JP | 2007-019331 A | 1/2007 |
| JP | 2011-249667 A | 12/2011 |

(Continued)

OTHER PUBLICATIONS

International Search Report in counterpart International Application No. PCT/JP2015/077984, dated Dec. 15, 2015.

*Primary Examiner* — Shannon M Gardner
(74) *Attorney, Agent, or Firm* — Baker Botts L.L.P.; Michael A. Sartori

(57) ABSTRACT

Provided is a photovoltaic apparatus including: a power generation part including a plurality of power generating elements each generating power in accordance with an amount of received light, the power generation part having a light receiving surface and a back surface positioned on an opposite side to the light receiving surface; a function part provided separately from the power generation part and configured to provide functions regarding the photovoltaic apparatus; and a position changeable part provided between the power generation part and the function part and capable of changing positions of the power generation part and the function part, wherein the back surface of the power generation part faces the function part face, and the position changeable part is capable of changing the positions of the power generation part and the function part while maintain- (Continued)

ing a state where the back surface of the power generation part faces the function part.

8 Claims, 11 Drawing Sheets

(51) Int. Cl.
*F24S 30/452* (2018.01)
*F24S 30/00* (2018.01)
*F24S 23/30* (2018.01)

(56) References Cited

U.S. PATENT DOCUMENTS

| 2012/0174963 A1* | 7/2012 | Thompson | G01S 3/7861 |
| | | | 136/246 |
| 2012/0279550 A1* | 11/2012 | Noble | F24J 2/5232 |
| | | | 136/246 |
| 2014/0209146 A1* | 7/2014 | Park | F24J 2/38 |
| | | | 136/246 |
| 2014/0366929 A1 | 12/2014 | Blau | |

FOREIGN PATENT DOCUMENTS

| JP | 5098678 B2 | 12/2012 |
| WO | 2013/093909 A1 | 6/2013 |

* cited by examiner

PHOTOVOLTAIC APPARATUS

TECHNICAL FIELD

The present invention relates to a photovoltaic apparatus, and in particular, relates to a photovoltaic apparatus capable of changing the position of the light receiving surface thereof.

BACKGROUND ART

Concentrator photovoltaic apparatuses are being developed in which sunlight is converged onto power generating elements by use of lenses and the like to increase power generation efficiency of the power generating elements. In concentrator photovoltaic apparatuses, for example, a photovoltaic panel is mounted to the distal end of a post, and the light receiving surface of the photovoltaic panel is controlled so as to be oriented toward the direction of the sun.

As one example of concentrator photovoltaic apparatuses, Japanese Patent No. 5098678 (PATENT LITERATURE 1) discloses the following technology. That is, in this photovoltaic apparatus, a post is set on a base perpendicularly thereto. A horizontal rotation drive mechanism is provided at the distal end of the post to rotate a power generation module in the horizontal direction. Jacks support the power generation module such that the tilt angle of the power generation module can be changed. A control panel is mounted to the post to control the horizontal rotation drive mechanism and the jacks.

Japanese Laid-Open Patent Publication No. 2011-249667 (PATENT LITERATURE 2) discloses the following technology. That is, in this photovoltaic apparatus, a control box provided on a post causes a panel to tilt and rotate horizontally so as to maintain a state where the panel is oriented toward the sun. After the operation of tracking the sun for the day ends, the control box causes the panel to take a horizontal orientation in consideration of influence of wind, and causes the panel to wait. While the panel being in this waiting state, the control box executes operation of cleaning the light receiving surface of the panel with a rotating brush.

CITATION LIST

Patent Literature

PATENT LITERATURE 1: Japanese Patent No. 5098678
PATENT LITERATURE 2: Japanese Laid-Open Patent Publication No. 2011-249667

SUMMARY OF INVENTION

Technical Problem

In such a photovoltaic apparatus as above, since the control panel or the control box includes electronic components and the like, there may be cases where the photovoltaic apparatus fails to operate normally due to rise in temperature.

In a case where the photovoltaic apparatus is installed at a location in the northern hemisphere, for example, its control panel is mounted to the side face on the north of the post supporting the photovoltaic panel at a position 1 m to 2 m above the ground, where easy maintenance is ensured and rise in temperature due to direct sunlight and rise in temperature due to radiant heat from the ground are avoided. However, since the position of the sun observed on the earth changes with time, it is difficult to prevent all day the entirety of the control panel from being exposed to direct sunlight.

The present invention has been made in order to solve the above problem. An object of the present invention is to provide a photovoltaic apparatus capable of suppressing poor operation due to high temperature and capable of realizing stabler operation.

Solution to Problem (1) In order to solve the above problem, a photovoltaic apparatus according to an aspect of the present invention includes: a power generation part including a plurality of power generating elements each generating power in accordance with an amount of received light, the power generation part having a light receiving surface and a back surface positioned on an opposite side to the light receiving surface; a function part provided separately from the power generation part and configured to provide functions regarding the photovoltaic apparatus; and a position changeable part provided between the power generation part and the function part and capable of changing positions of the power generation part and the function part. In the photovoltaic apparatus, the back surface of the power generation part and the function part face each other, and the position changeable part is capable of changing the positions of the power generation part and the function part while maintaining a state where the back surface of the power generation part and the function part face each other.

The present invention can be realized not only as a photovoltaic apparatus but also as a photovoltaic system including the photovoltaic apparatus.

Advantageous Effects of Invention

According to the present invention, it is possible to suppress poor operation due to high temperature and to realize stabler operation.

DESCRIPTION OF EMBODIMENTS

Figure 1:
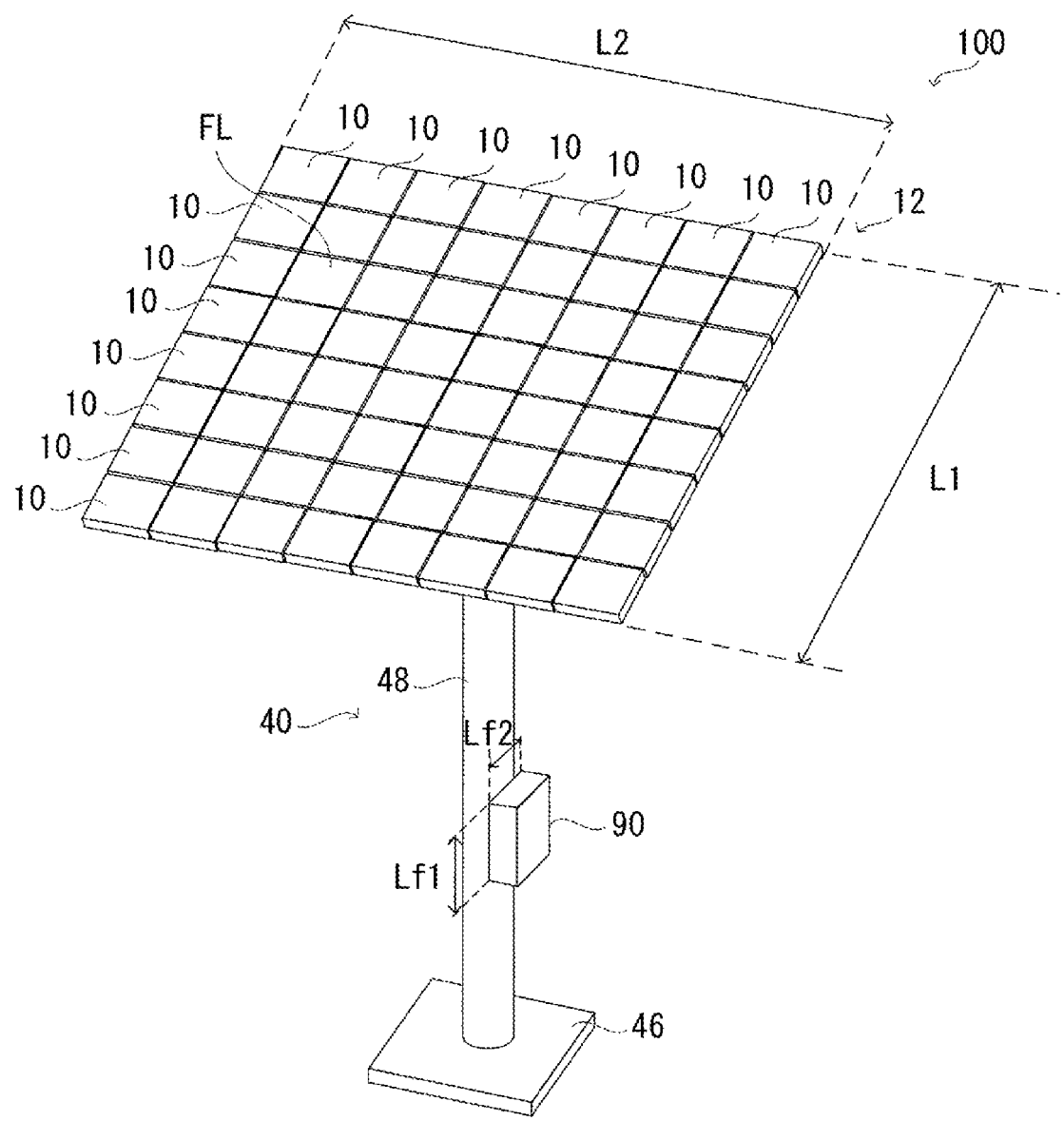
FIG. 1 is a perspective view of Comparative Example of a photovoltaic apparatus according to a first embodiment of the present invention.

First, contents of embodiments of the present invention will be listed for description.

(1) A photovoltaic apparatus according to an embodiment of the present invention includes: a power generation part including a plurality of power generating elements each generating power in accordance with an amount of received light, the power generation part having a light receiving surface and a back surface positioned on an opposite side to the light receiving surface; a function part provided separately from the power generation part and configured to provide functions regarding the photovoltaic apparatus; and a position changeable part provided between the power generation part and the function part and capable of changing positions of the power generation part and the function part. In the photovoltaic apparatus, the back surface of the power generation part and the function part face each other, and the position changeable part is capable of changing the positions of the power generation part and the function part while maintaining a state where the back surface of the power generation part and the function part face each other.

With this configuration, in a case where the light receiving surface of the power generation part is oriented toward the direction of the sun, the function part is positioned on the opposite side to the sun relative to the power generation part. Thus, direct sunlight to the function part is blocked by the power generation part. In addition, since the function part and the power generation part are provided away from each other with the position changeable part interposed therebetween, the function part is less likely to be influenced by radiant heat from the power generation part. Accordingly, it is possible to prevent rise in temperature of the function part which may fail to operate normally due to high temperature. Thus, it is possible to suppress poor operation due to high temperature and to realize stabler operation.

(2) Preferably, in a plan view in a direction perpendicular to the light receiving surface, an entirety of the function part is hidden behind the light receiving surface.

With this configuration, in a case where the light receiving surface of the power generation part is oriented toward the direction of the sun, the entirety of the function part receives no direct sunlight from the sun. Thus, rise in temperature of the function part can be further suppressed.

(3) Preferably, the power generation part and the function part are joined to the position changeable part, and a center of gravity of the power generation part, a center of gravity of the position changeable part, and a center of gravity of the function part are aligned along one straight line, and the center of gravity of the position changeable part is positioned between the center of gravity of the power generation part and the center of gravity of the function part.

This configuration realizes the relationship in which, for example, the moment of force in the power generation part and the moment of force in the function part with respect to the position changeable part cancel each other. Thus, it is possible to reduce the torque to be generated in the motor that is included in the position changeable part and that is used in order to change the positions of the power generation part and the function part. Accordingly, for example, the motor can be downsized, and the power consumption of the motor and the control circuit of the motor can be reduced.

(4) Preferably, a distance between the function part and the position changeable part is determined based on a distance between the power generation part and the position changeable part.

With this configuration, for example, the distance between the function part and the position changeable part can be determined such that the moment of force in the function part and the moment of force in the power generation part with respect to the position changeable part are balanced with each other. Thus, the torque to be generated in the motor above can be further reduced.

(5) Preferably, the power generation part and the function part are joined to the position changeable part, and a ratio of a product of a weight of the function part and a distance between the function part and a joining point at which the function part and the position changeable part are joined together, relative to a product of a weight of the power generation part and a distance between the power generation part and a joining point at which the power generation part and the position changeable part are joined together, is included in a range of not less than ½ and not greater than 2.

With the configuration in which the ratio of the moment of force in the function part to the moment of force in the power generation part with respect to the position changeable part is included in a predetermined range, it is possible to actively use the function part as a counterbalance to the power generation part, thereby being able to substantially realize a state where the moment of force in the power generation part and the moment of force in the function part are balanced with each other. Accordingly, for example, occurrence of unnecessary backlash in the position changeable part can be suppressed, and thus, the direction of the light receiving surface can be controlled in a stabler manner.

(6) Preferably, the photovoltaic apparatus further includes: an arm part which is hollow, the arm part connecting the position changeable part and the function part with each other, connecting the function part and the power generation part with each other, or connecting the power generation part and the position changeable part with each other; and a wire passing through a hollow portion of the arm part, the wire connecting the position changeable part and the function part with each other, connecting the function part and the power generation part with each other, or connecting the power generation part and the position changeable part with each other.

With the configuration in which the wire passes through the inside of the arm part, for example, it is possible to prevent troubles in which tensile stress is applied on the wire due to mechanical operation of the photovoltaic apparatus, resulting in damage of the wire. Moreover, it is possible to reduce the play of the wire in length for not allowing the wire to hinder mechanical operation of the photovoltaic apparatus. Since the arm part can be used as a protection member for the wire, it is not necessary to separately provide a protection member to the wire.

(7) Preferably, the photovoltaic apparatus further includes: an arm part connecting the position changeable part and the function part with each other, connecting the function part and the power generation part with each other, or connecting the power generation part and the position changeable part with each other, and in the photovoltaic apparatus, the arm part is formed from FRP (fiber reinforced plastics).

With this configuration, it is possible to reduce the weight of the arm part while providing high strength to the arm part.

(8) Preferably, the photovoltaic apparatus further includes: an arm part connecting the position changeable part and the function part with each other, or connecting the function part and the power generation part with each other; and a heat insulating material provided between the arm part and the function part.

With this configuration, heat conduction from the arm part to the function part can be suppressed.

Hereinafter, embodiments of the present invention will be described with reference to the drawings. It should be noted that the same or corresponding parts are denoted by the same reference characters, and description thereof is not repeated. At least some parts of the embodiments descried below can be combined together as desired.

First Embodiment

[Comparative Example]

Figure 2:
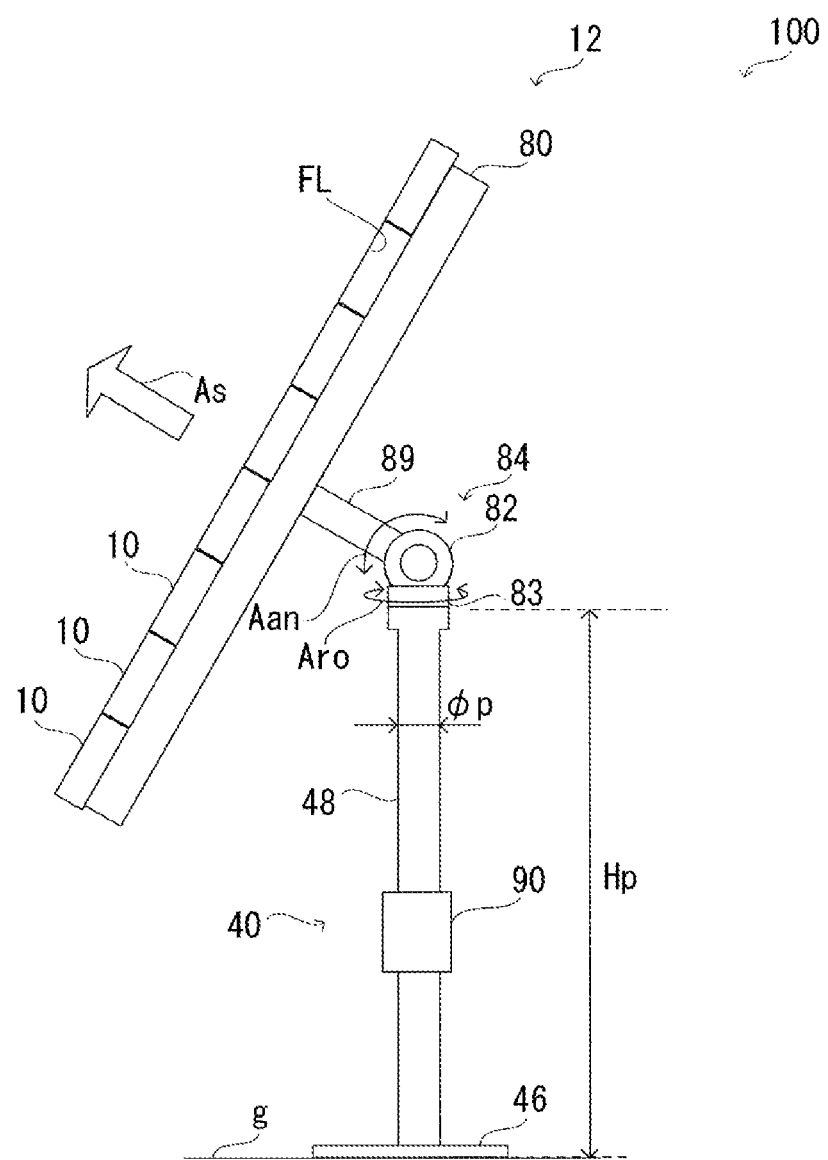
FIG. 2 is a side view of the photovoltaic apparatus shown in FIG. 1.

FIG. 1 is a perspective view of Comparative Example of a photovoltaic apparatus according to a first embodiment of the present invention. FIG. 2 is a side view of the photovoltaic apparatus shown in FIG. 1.

With reference to FIG. 1 and FIG. 2, a photovoltaic apparatus 100 includes a photovoltaic panel (power generation part) 12, a pedestal 40, a panel arm 89, a position changeable part 84, and a function part 90. The photovoltaic panel 12 includes a plurality of power generation modules 10, a sun direction sensor 25 not shown, and a frame part 80. The position changeable part 84 includes an elevation drive part 82 and an azimuth drive part 83. The pedestal 40 includes a base 46 and a post 48. The photovoltaic panel 12 includes a light receiving surface FL.

The photovoltaic panel 12 has a plate-like shape as a whole, for example. Here, the photovoltaic panel 12 includes 8 lines by 8 rows of power generation modules 10, that is, includes 64 power generation modules 10 in total. The power generation modules 10 are mounted in lines and rows on the upper face of the frame part 80. Each power generation module 10 receives sunlight to generate power, and outputs, by using a wire not shown, direct-current power which is the generated power, to the function part 90 mounted on a side face of the post 48.

The panel arm 89 connects the photovoltaic panel 12 and the position changeable part 84 with each other. The post 48 is set, for example, on the base 46 provided on a ground g, perpendicularly to the ground g.

The position changeable part 84 is mounted to the distal end of the post 48. Based on a control signal from the function part 90, the position changeable part 84 operates such that the direction of the light receiving surface FL of the photovoltaic panel 12, i.e., the direction of the normal line of the light receiving surface FL indicated by an arrow As, tracks the sun from sunrise to sunset, with the direction of the light receiving surface FL oriented toward the sun.

Specifically, for example, the elevation drive part 82 of the position changeable part 84 includes a motor, and tilts the panel arm 89 as indicated by an arrow Aan, thereby to drive the photovoltaic panel 12 in the elevation direction.

The azimuth drive part 83 is provided below the elevation drive part 82. For example, the azimuth drive part 83 includes a motor, and rotates the elevation drive part 82 in the horizontal direction as indicated by an arrow Aro, thereby to drive the photovoltaic panel 12 in the azimuth direction.

The sun direction sensor 25 not shown is used for detecting the direction of the sun, and outputs a sensor signal indicating a detection result, to the function part 90.

The function part 90 provides functions regarding the photovoltaic apparatus 100. Specifically, for example, the function part 90 includes a housing and various types of units accommodated in the housing. More specifically, for example, the housing accommodates, as unit that provide functions regarding the photovoltaic apparatus 100, at least one of: a connection box which connects wires from the respective power generation modules 10 with each other; a power conditioner which converts direct-current power outputted from the power generation modules 10, into alternating-current power; a control unit for controlling the orientation of the light receiving surface FL of the photovoltaic panel 12; a monitoring circuit for displaying the operation state of the photovoltaic apparatus 100; a safety circuit; measuring devices such as a thermometer; and a data logger.

A length L1 in the lengthwise direction and a length L2 in the widthwise direction of the photovoltaic panel 12 are each 5 m to 8 m, for example. A height Hp of the post 48 is 3 m to 6 m, for example. A length Lf1 in the direction perpendicular to the ground g of the face on the post 48 side of the function part 90 and a length Lf2 in the direction parallel to the ground g of the face on the post 48 side of the function part 90 are each 1 m, for example. A diameter φp of the post 48 is 0.4 m to 1 m, for example. The weight of the photovoltaic panel 12 is 1000 kg, for example. The weight of the function part 90 is 100 kg, for example.

[Explanation of Problem]

When the function part 90 is to be mounted on the post 48, the function part 90 may be exposed to direct sunlight. In this case, in the photovoltaic apparatus 100, heat generated in the post 48 due to direct sunlight is readily transferred from the post 48 to the function part 90. Further, since the function part 90 is less likely to receive wind from the direction of the post 48, the function part 90 may not dissipate heat efficiently. Thus, the temperature of the function part 90 tends to increase.

For example, in a case where the photovoltaic apparatus 100 is installed in a desert, the air temperature during night time may become about minus 10° C. due to radiation cooling, whereas the air temperature during day time may become about 50° C. due to radiant heat from the ground, and the like.

For example, in a state where the air temperature around the photovoltaic apparatus 100 is about 50° C., when the function part 90 receives direct sunlight, the temperature of the housing of the function part 90 may become about 70° C., and the temperature inside the housing may become about 60° C. For example, in a case where the guaranteed operating temperatures of units included in the function part 90 are 40° C. or lower, if the temperature inside the housing becomes 60° C., the function part 90 may fail to operate normally.

As described above, the photovoltaic panel 12 is controlled such that the light receiving surface FL is oriented toward the direction of the sun. Thus, it is seen that the surface on the opposite side to the light receiving surface FL of the photovoltaic panel 12 receives no direct sunlight all day. The inventors of the present invention focused on this point, and devised a configuration in which the function part 90 is mounted to the surface on the opposite side to the light receiving surface FL of the photovoltaic panel 12, so that the function part 90 receives no direct sunlight.

However, even with such a configuration, the temperature of the function part 90 may rise due to radiant heat from the photovoltaic panel 12 and the like, for example.

In addition, in a case where the function part 90 is cooled by providing a fan in the housing of the function part 90, dust and the like enter the housing of the function part 90, which may cause failure of the function part 90. In a case where a cooler is provided in the function part 90 and the function part 90 is cooled by use of the cooler, production cost and power generating cost of the photovoltaic apparatus 100 will increase.

Therefore, a photovoltaic apparatus according to the first embodiment of the present invention will solve such problems by the following configuration.

[Configuration and Basic Operation]

Figure 3:
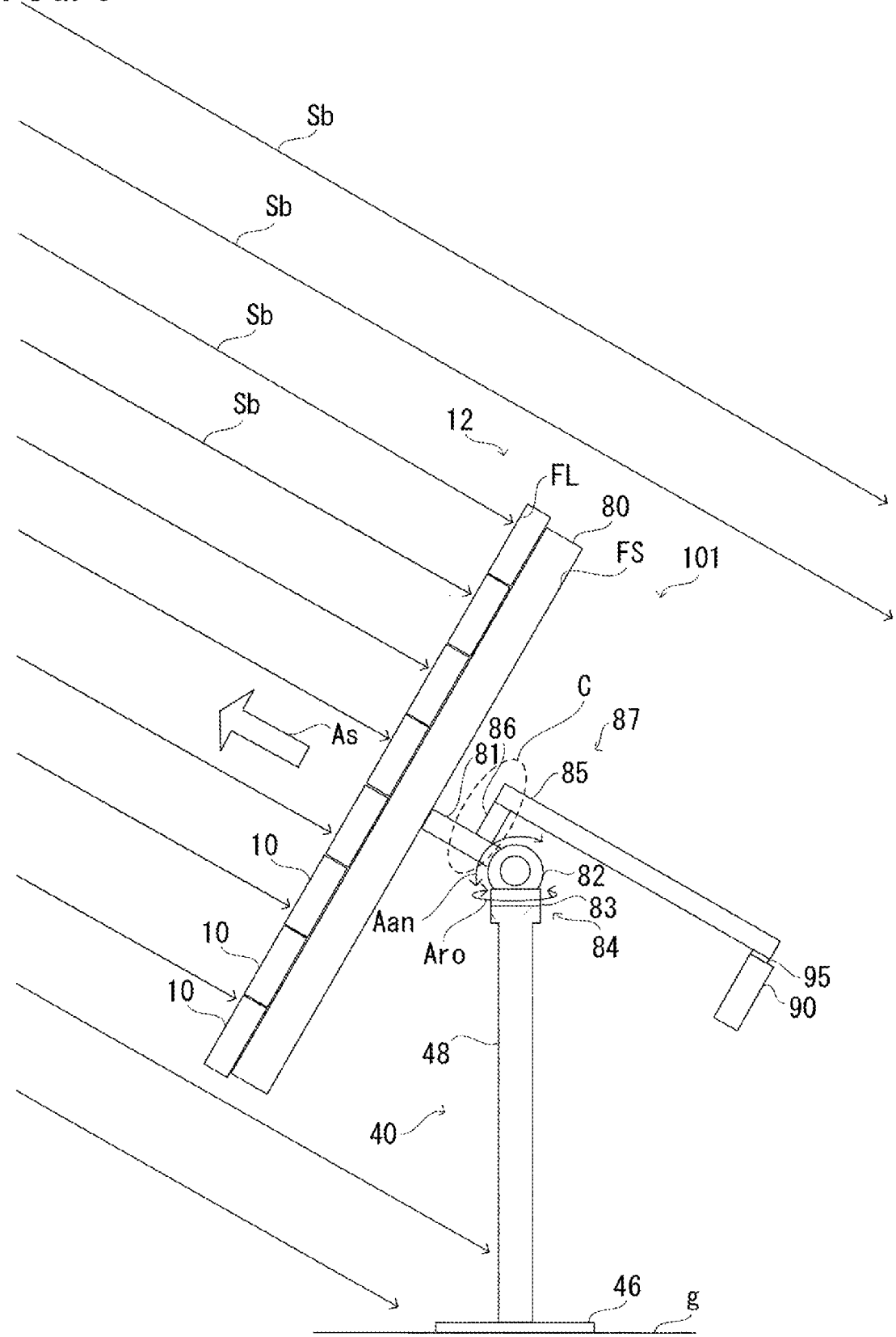
FIG. 3 is a side view of a photovoltaic apparatus according to the first embodiment of the present invention.
Figure 4:
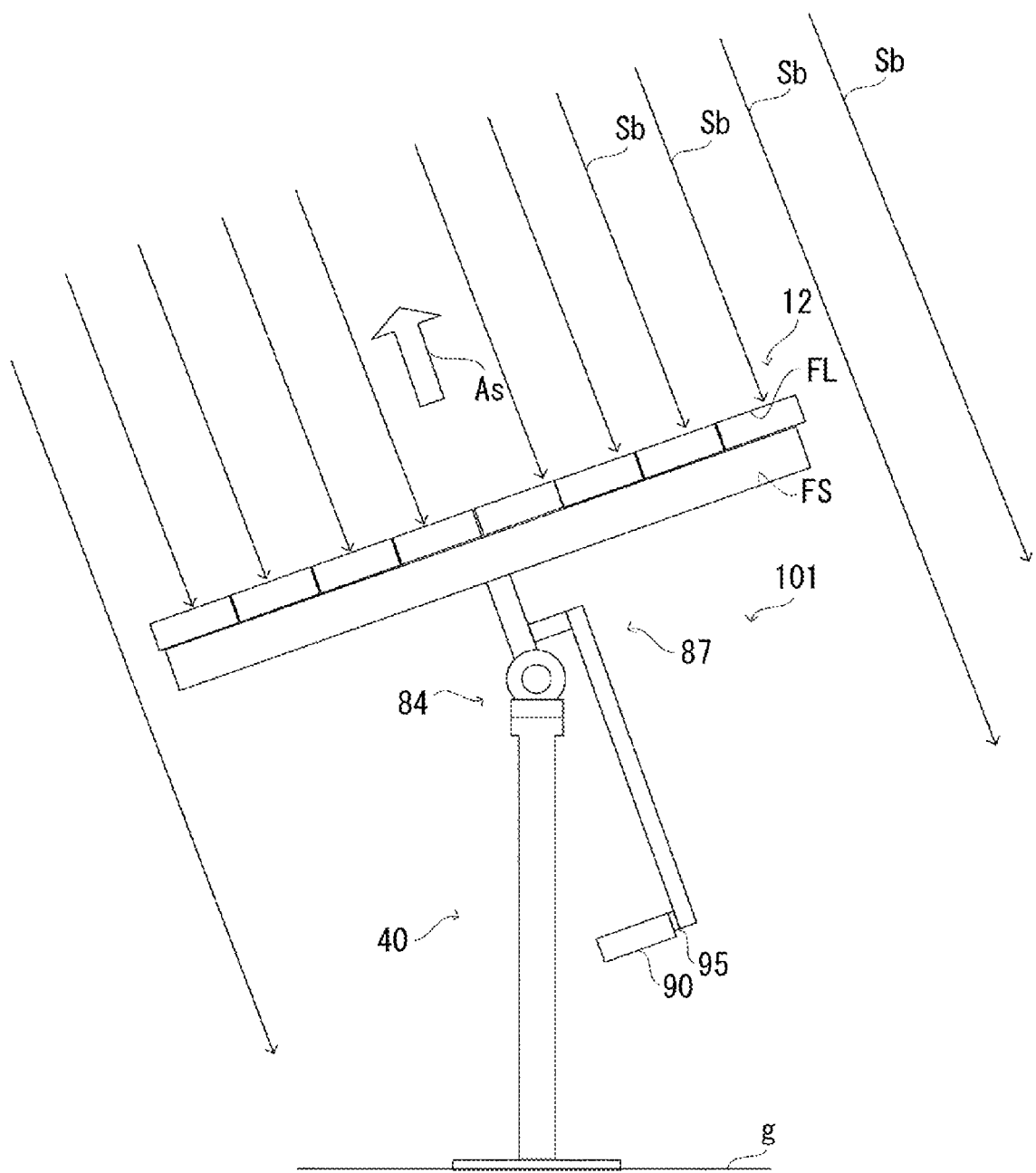
FIG. 4 shows a state where a light receiving surface of a photovoltaic panel of the photovoltaic apparatus shown in FIG. 3 is oriented toward a direction different from that in FIG. 3.

FIG. 3 is a side view of the photovoltaic apparatus according to the first embodiment of the present invention. FIG. 4 shows a state where the light receiving surface of the photovoltaic panel of the photovoltaic apparatus shown in FIG. 3 is oriented toward a direction different from that in FIG. 3. Except the contents described below, a photovoltaic apparatus 101 has the same configurations as those described with reference to FIG. 1 and FIG. 2.

With reference to FIG. 3 and FIG. 4, the photovoltaic apparatus 101 includes the photovoltaic panel 12, the pedestal 40, an arm part 87, the position changeable part 84, the function part 90, and a heat insulating material 95. The photovoltaic panel 12 includes the plurality of power generation modules 10, the sun direction sensor 25 not shown, and the frame part 80.

The position changeable part 84 includes the elevation drive part 82 and the azimuth drive part 83. The pedestal 40 includes the base 46 and the post 48. The arm part 87 includes a panel arm 81, a function part arm 85, and an arm connection part 86. The photovoltaic panel 12 has the light receiving surface FL and a back surface FS. The back surface FS is the surface on the opposite side to the light receiving surface FL of the photovoltaic panel 12.

Each power generation module 10 of the photovoltaic panel 12 receives sunlight to generate power, and outputs, by using a wire 180 not shown, direct-current power which is the generated power, to the function part 90.

The position changeable part 84 is provided between the photovoltaic panel 12 and the function part 90. The photovoltaic panel 12 and the function part 90 are joined to the position changeable part 84. Specifically, the arm part 87 mutually connects the photovoltaic panel 12, the position changeable part 84, and the function part 90.

In other words, the arm part 87 to which the photovoltaic panel 12 is fixed and to which the function part 90 is fixed is mounted to the position changeable part 84.

In detail, for example, the panel arm 81 of the arm part 87 connects the photovoltaic panel 12 and the position changeable part 84 with each other. The panel arm 81 is mounted to the photovoltaic panel 12, perpendicularly to the light receiving surface FL, for example. The function part 90 is mounted to an end of the function part arm 85. The function part 90 is mounted to the function part arm 85 such that the widest face of the housing of the function part 90 is parallel to the back surface FS of the photovoltaic panel 12, for example. The arm connection part 86 connects the panel arm 81 and the function part arm 85 with each other.

Here, between the function part arm 85 and the function part 90, the heat insulating material 95 is provided, thereby suppressing conduction of heat from the photovoltaic panel 12 to the function part 90. That is, the arm part 87 connects the position changeable part 84 and the function part 90 with each other, via the heat insulating material 95.

The post 48 is set on the base 46 provided on the ground g, perpendicularly to the ground g, for example. The position changeable part 84 is mounted to the distal end of the post 48.

The sun direction sensor 25 not shown is used to detect the direction of the sun, and outputs a sensor signal indicating the detection result, to the function part 90.

The function part 90 is provided separately from the photovoltaic panel 12. Specifically, for example, the function part 90 is provided at a certain distance from the photovoltaic panel 12. The function part 90 faces the back surface FS of the photovoltaic panel 12.

Based on a control signal from the function part 90, the position changeable part 84 operates such that the direction of the light receiving surface FL of the photovoltaic panel 12, i.e., the direction of the normal line of the light receiving surface FL indicated by the arrow As, tracks the sun, with the direction of the light receiving surface FL oriented toward the sun.

At this time, by changing the angle of the arm part 87, the position changeable part 84 changes the positions of the photovoltaic panel 12 and the function part 90, i.e., the positions of the light receiving surface FL and the function part 90 while maintaining the state where the function part 90 and the back surface FS face each other.

Specifically, for example, the elevation drive part 82 of the position changeable part 84 includes a motor, and rotates the arm part 87 as indicated by the arrow Aan, thereby to drive the photovoltaic panel 12 and the function part 90 in the elevation direction.

The azimuth drive part 83 is provided below the elevation drive part 82. For example, the azimuth drive part 83 includes a motor, and rotates the elevation drive part 82 in the horizontal direction as indicated by the arrow Aro, thereby to drive the photovoltaic panel 12 and the function part 90 in the azimuth direction.

Accordingly, also after the position of the sun has changed, the function part 90 is positioned on the opposite side to the sun relative to the photovoltaic panel 12. For example, in a plan view in a direction perpendicular to the light receiving surface FL of the photovoltaic panel 12, the function part 90 is positioned such that the entirety thereof is hidden behind the light receiving surface FL of the photovoltaic panel 12.

Thus, direct sunlight from the sun indicated by arrows Sb is blocked by the photovoltaic panel 12 and does not reach the function part 90. That is, the function part 90 receives no direct sunlight all day.

In addition, since the function part 90 is provided away from the photovoltaic panel 12, the function part 90 is less likely to be influenced by radiant heat from the photovoltaic panel 12.

Furthermore, since the function part 90 is provided away from the post 48, compared with a case where the function part 90 is mounted to the post 48, it is easy for the function part 90 to receive wind blowing in the direction parallel to the ground. Accordingly, the function part 90 is effectively air-cooled.

Figure 5:
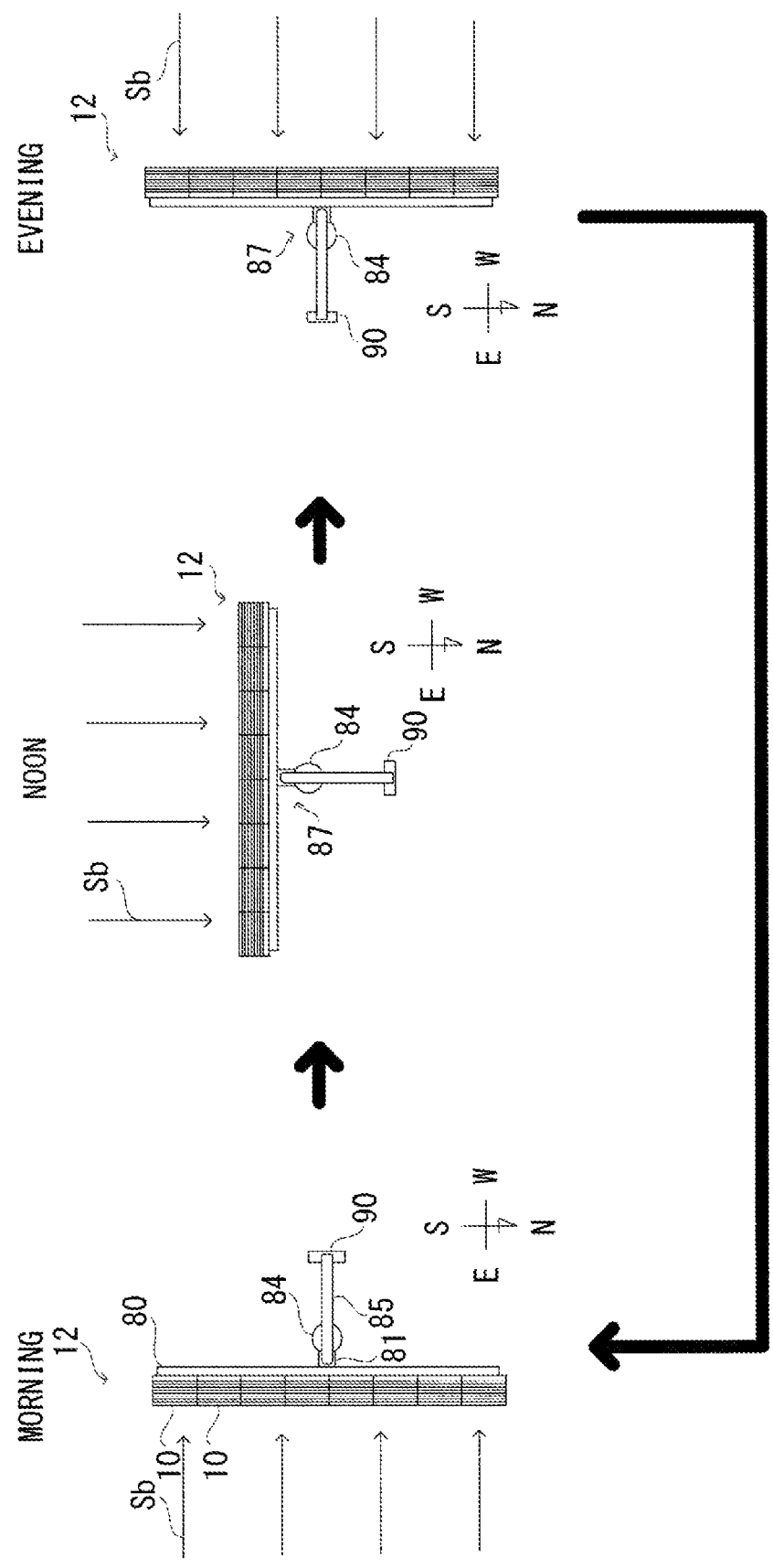
FIG. 5 shows one example of change in the azimuth direction of the orientation of the photovoltaic panel of the photovoltaic apparatus according to the first embodiment of the present invention.

FIG. 5 shows one example of change in the azimuth direction of the orientation of the photovoltaic panel of the photovoltaic apparatus according to the first embodiment of the present invention.

FIG. 5 is a view of the photovoltaic apparatus 101 seen from above, and shows change in a day of the orientation of the photovoltaic panel 12. Here, the focus is on the change in the azimuth direction of the orientation of the photovoltaic panel 12, and it is assumed that the photovoltaic panel 12 does not change its orientation in the elevation direction.

With reference to FIG. 5, the photovoltaic panel 12 is controlled so as to rotate about the position changeable part 84 and to be oriented toward the direction of the sun from morning till evening.

For example, at a location in the northern hemisphere in a certain season, the light receiving surface FL of the photovoltaic panel 12 is oriented toward east in the morning, is oriented toward south at noon, and is oriented toward west in the evening. Therefore, even when the sun has moved, the function part 90 is positioned at the side opposite to the sun relative to the photovoltaic panel 12, and thus, the function part 90 receives no direct sunlight indicated by the arrows Sb all day.

Figure 6:
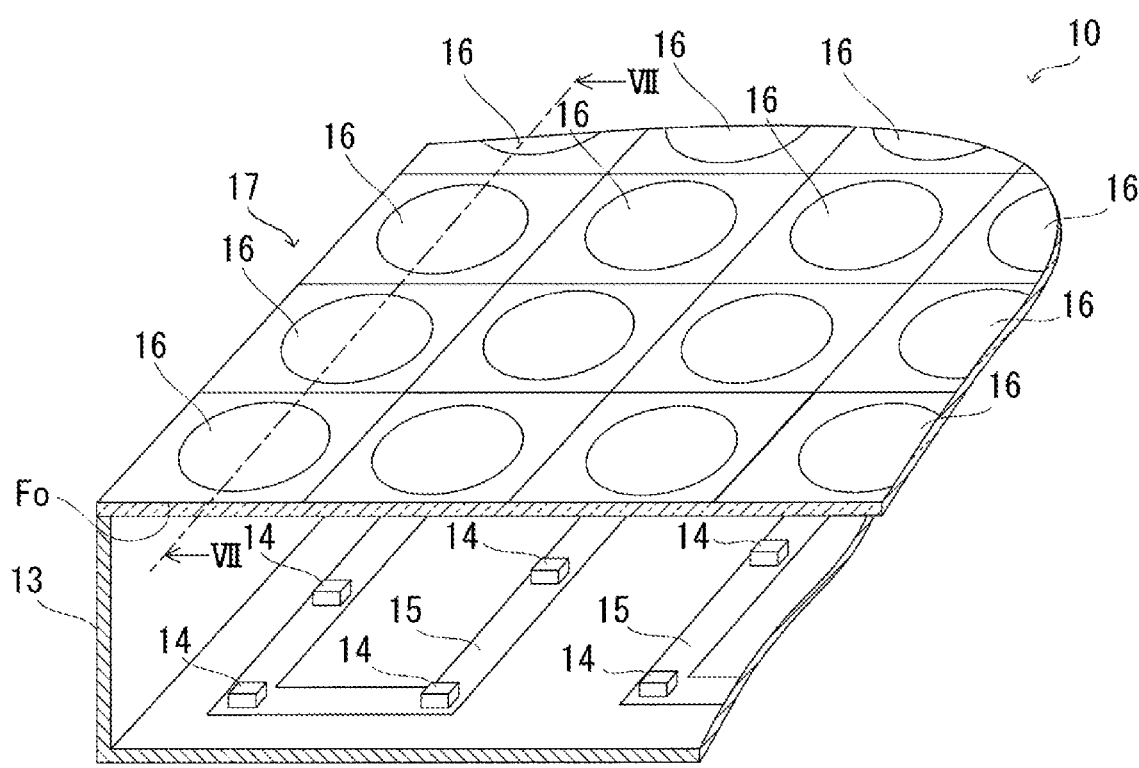
FIG. 6 shows a configuration of a photovoltaic module in the photovoltaic panel of the photovoltaic apparatus according to the first embodiment of the present invention.
Figure 7:
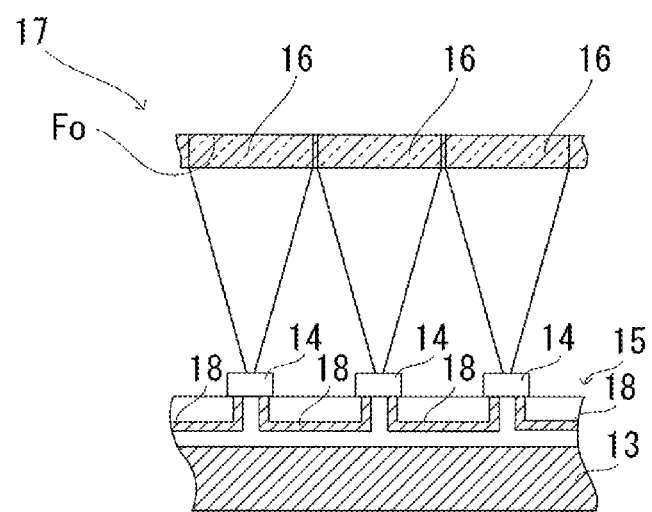
FIG. 7 is a cross-sectional view showing the cross section along the line VII-VII in FIG. 6 of the photovoltaic module in the photovoltaic panel of the photovoltaic apparatus according to the first embodiment of the present invention.

FIG. 6 shows a configuration of a photovoltaic module in the photovoltaic panel of the photovoltaic apparatus according to the first embodiment of the present invention. FIG. 7 is a cross-sectional view showing the cross section along the line VII-VII in FIG. 6 of the photovoltaic module in the photovoltaic panel of the photovoltaic apparatus according to the first embodiment of the present invention.

With reference to FIG. 6 and FIG. 7, each power generation module 10 includes a housing 13, a plurality of power generating elements 14, a flexible printed circuit (FPC) 15, and a light receiving part 17. The light receiving part 17 includes a plurality of Fresnel lenses 16. The flexible printed circuit 15 includes a conductive part 18.

The light receiving part 17 receives sunlight at the upper main surface Fo. In the light receiving part 17, the Fresnel lenses 16 are arranged in a square lattice pattern, for example. Specifically, the Fresnel lenses 16 are arranged such that the distances between the centers of Fresnel lenses 16 that are adjacent to each other are equal. Each Fresnel lens 16 converges, to its corresponding power generating element 14, sunlight perpendicularly arriving at the main surface Fo of the light receiving part 17. The light receiving part 17 is fixed so as to be spaced from and in parallel to the bottom of the housing 13.

Each power generating element 14 is positioned on the optical axis of its corresponding Fresnel lens 16, and receives sunlight converged by its corresponding Fresnel lens 16, to generate power in accordance with the amount of the received light.

Each power generating element 14 is mounted on the flexible printed circuit 15 having a strip shape. Power generating elements 14 that are adjacent to each other on the flexible printed circuit 15 are connected to each other in series by the conductive part 18 included in the flexible printed circuit 15, for example. Power generated at each power generating element 14 is outputted to the outside of the power generation module 10 through the conductive part 18.

The size of each Fresnel lens 16 is 50 mm×50 mm, for example. The size of each power generating element 14 is 3.2 mm×3.2 mm, for example.

Here, for example, the light receiving surface FL shown in FIG. 3 is an assembly of the main surfaces Fo of the light receiving part 17 in each power generation module 10 of the photovoltaic panel 12. Each main surface Fo may be flat or uneven.

Figure 8:
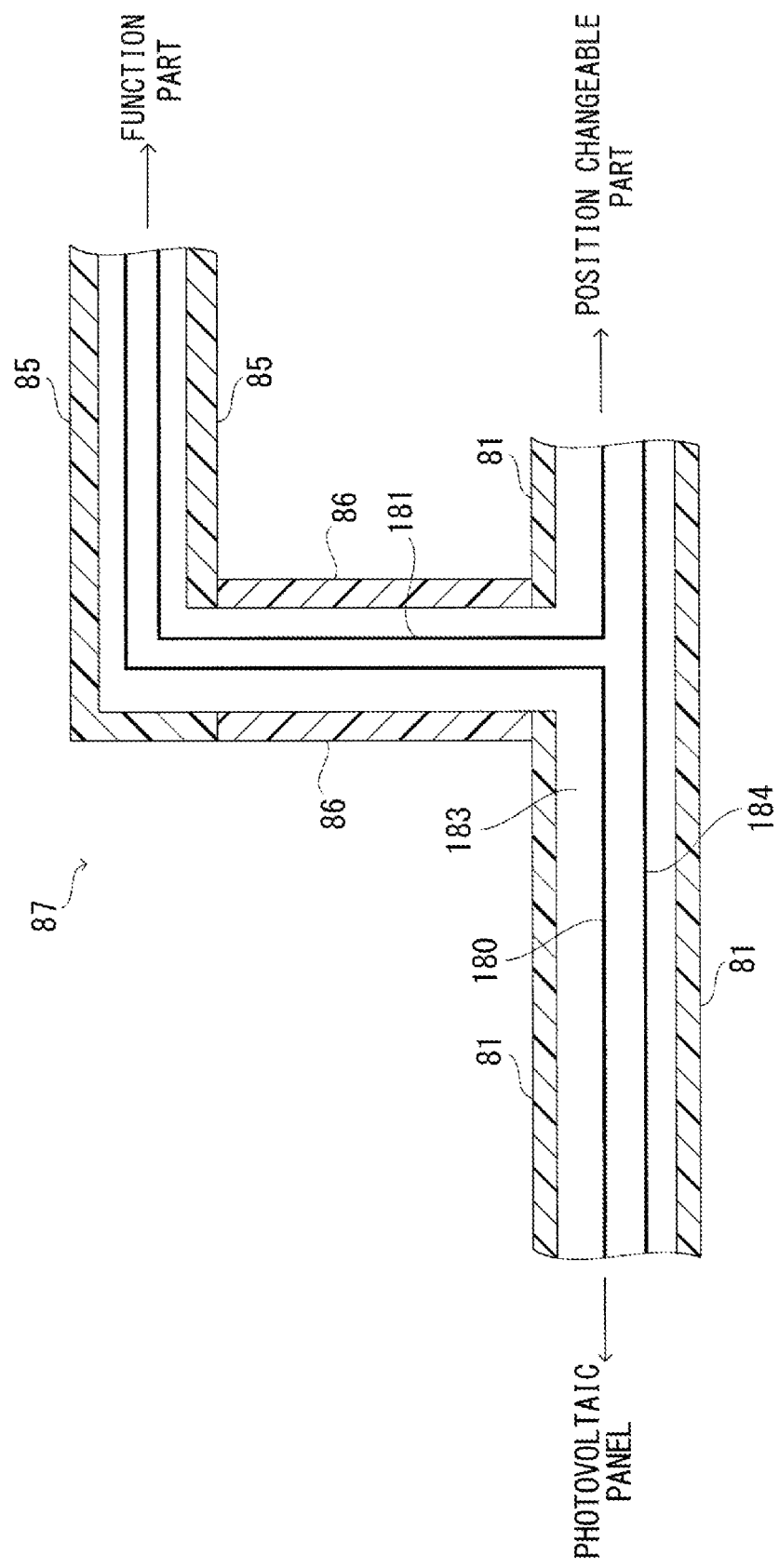
FIG. 8 is a cross-sectional view showing the cross section, along the direction in parallel to the sheet of the drawing, of a portion C indicated by a dot line in FIG. 3 of an arm part of the photovoltaic apparatus according to the first embodiment of the present invention.

FIG. 8 is a cross-sectional view showing the cross section, along the direction in parallel to the sheet of the drawing, of a portion C indicated by a dot line in FIG. 3 of an arm part of the photovoltaic apparatus according to the first embodiment of the present invention.

With reference to FIG. 8, the arm part 87 is a hollow member, for example. Specifically, each of the panel arm 81, the arm connection part 86, and the function part arm 85 is a hollow member. The panel arm 81, the arm connection part 86, and the function part arm 85 are continuous in this order, and the hollow portion in each of these three members are also continuous.

The photovoltaic apparatus 101 includes wires 180, 181, and 184 which pass through a hollow portion 183 of the arm part 87. The wire 180 electrically connects the photovoltaic panel 12 and the function part 90 with each other. The wire 181 electrically connects the function part 90 and the position changeable part 84 with each other. The wire 184 electrically connects the photovoltaic panel 12 and the position changeable part 84 with each other.

Each of the wires 180, 181, and 184 is a bundle of a plurality of electric wires, for example. Each of the wires 180, 181, and 184 may include either one or both of a signal line and a power line. Each of the wires 180, 181, and 184 may not be formed by a plurality of electric wires, but may be formed by one electric wire.

The arm part 87 is formed from FRP (fiber reinforced plastics), for example. Accordingly, the arm part 87 is light in weight and has a high strength.

Figure 9:
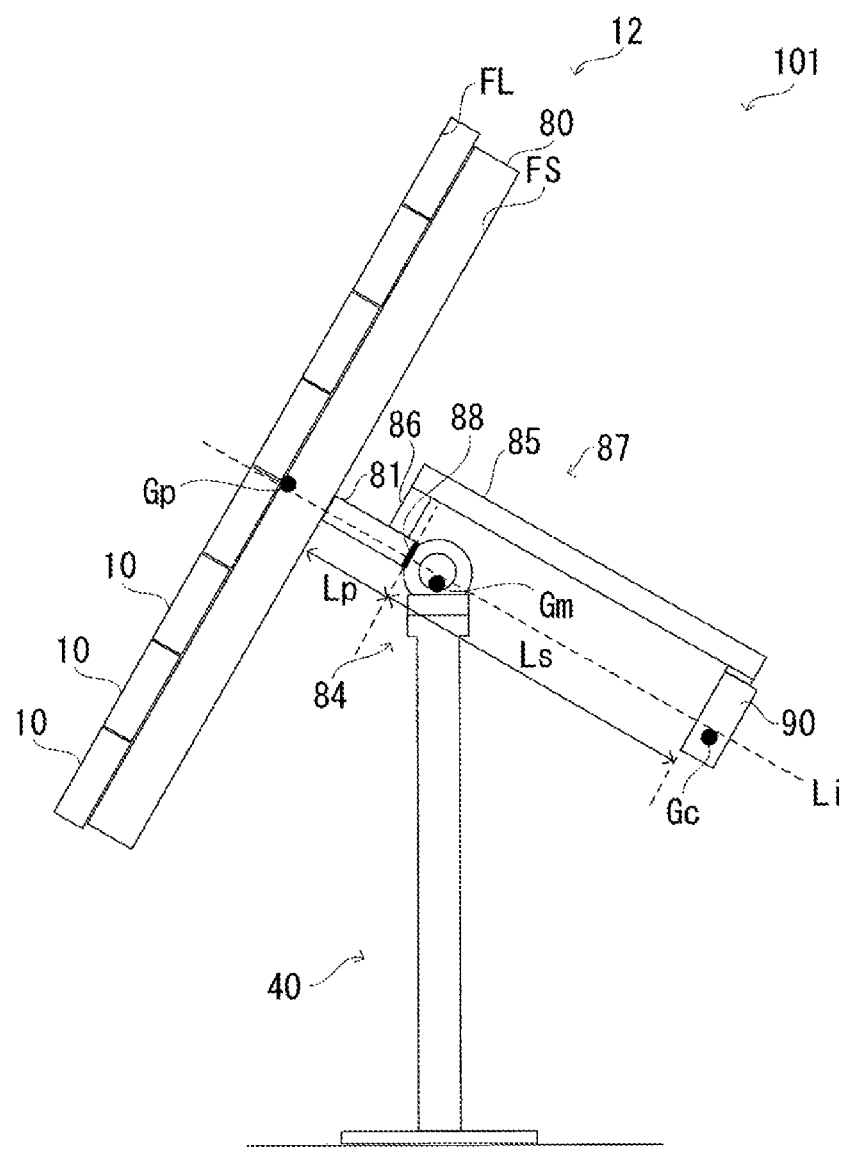
FIG. 9 is a diagram for explaining in detail the positional relationship among the photovoltaic panel, a position changeable part, and a function part in the photovoltaic apparatus according to the first embodiment of the present invention.

FIG. 9 is a diagram for explaining in detail the positional relationship among the photovoltaic panel, the position changeable part, and the function part in the photovoltaic apparatus according to the first embodiment of the present invention.

With reference to FIG. 9, the photovoltaic panel 12 and the function part 90 are joined to the position changeable part 84. Specifically, the photovoltaic panel 12 and the function part 90 are joined to the position changeable part 84 by means of the arm part 87, at a joining point 88 in the position changeable part 84. That is, the joining point 88 serves as a joining point at which the photovoltaic panel 12 and the position changeable part 84 are joined together, and as a joining point at which the function part 90 and the position changeable part 84 are joined together.

For example, a center of gravity of changeable part Gm being the center of gravity of the position changeable part 84 is positioned between a center of gravity of panel Gp being the center of gravity of the photovoltaic panel 12 and a center of gravity of function part Gc being the center of gravity of the function part 90. In addition, for example, the center of gravity of panel Gp, the center of gravity of changeable part Gm, and the center of gravity of function part Gc are aligned along a straight line Li. The straight line Li is a straight line perpendicular to the light receiving surface FL, for example.

Here, the distance between the function part 90 and the position changeable part 84 is determined based on the distance between the photovoltaic panel 12 and the position changeable part 84, for example.

For example, the load applied on the motor which rotates the photovoltaic panel 12 and the function part 90 in the position changeable part 84, that is, the load applied on the motor which changes the angle of the arm part 87 and which is included in the position changeable part 84 becomes minimum in a case where the moment of force in the photovoltaic panel 12 and the moment of force in the function part 90 are balanced with each other.

Thus, the distance between the function part 90 and the position changeable part 84 is set such that the moment of force in the photovoltaic panel 12 and the moment of force in the function part 90 are balanced with each other, for example.

In addition, for example, the positions and the weights of the photovoltaic panel 12 and the function part 90 are set such that the ratio of the product of the weight of the function part 90 and the distance between the joining point 88 and the function part 90, relative to the product of the weight of the photovoltaic panel 12 and the distance between the joining point 88 and the photovoltaic panel 12, is included in a range of not less than ½ and not greater than 2.

That is, in a case where the distance between the joining point 88 and the photovoltaic panel 12 is Lp, the weight of the photovoltaic panel 12 is Wp, the distance between the joining point 88 and the function part 90 is Ls, and the weight of the function part 90 is Ws, the positions and the weights of the photovoltaic panel 12 and the function part 90 are set so as to have the relationship represented by Expression (1) below:

$$½ \leq (Lp \times Wp)/(Ls \times Ws) \leq 2 \qquad (1)$$

Specifically, for example, in a case where the distance Lp between the joining point 88 and the photovoltaic panel 12 is 0.3 m, the weight Wp of the photovoltaic panel 12 is 1000 kg, and the weight Ws of the function part 90 is 100 kg, the distance Ls between the joining point 88 and the function part 90 is set at 3 m, for example.

It should be noted the method of adjusting the distance as described above is not necessarily adopted. For example, a weight may be attached to the function part 90 or the photovoltaic panel 12 such that the ratio of the second product relative to the first product is included in the range of not less than ½ and not greater than 2.

Alternatively, for example, the arm part 87 may be expanded and contracted so as to be able to change the distance from the joining point 88 to the photovoltaic panel 12, or the distance from the joining point 88 to the photovoltaic panel 12. Further, for example, the mounting position in the arm part 87 of the function part 90 may be changeable.

[Modification]

In the photovoltaic apparatus 101 according to the first embodiment of the present invention, one function part 90 is fixed to the arm part. However, the present invention is not limited to this configuration. For example, a plurality of function parts 90 may be fixed to the arm part.

Figure 10:
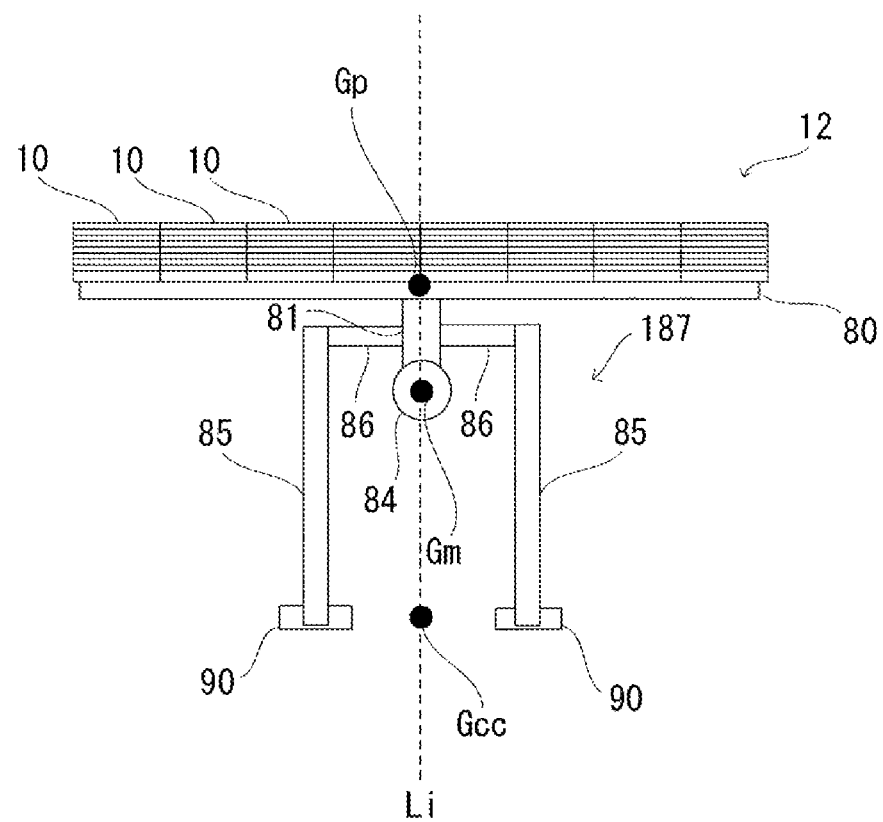
FIG. 10 is a view of a modification of the photovoltaic apparatus according to the first embodiment of the present invention, seen from above.

FIG. 10 is a view of a modification of the photovoltaic apparatus according to the first embodiment of the present invention, seen from above.

With reference to FIG. 10, compared with the photovoltaic apparatus 101 shown in FIG. 3, a modification of the photovoltaic apparatus 101 includes: an arm part 187 instead of the arm part 87; and two function parts 90. The arm part 187 includes the panel arm 81, two function part arms 85, and two arm connection parts 86.

The arm part 187 is mounted to the position changeable part 84. The arm part 187 has the photovoltaic panel 12 and the two function parts 90 mounted thereto.

In detail, the panel arm 81 of the arm part 187 connects the photovoltaic panel 12 and the position changeable part 84 with each other. Each function part arm 85 has the function part 90 mounted thereto. Each arm connection part 86 connects the panel arm 81 and its corresponding function part arm 85 with each other.

The function parts 90 provide functions regarding the photovoltaic panel 12. The respective function parts 90 include units as described above of different kinds from each other, for example.

For example, the center of gravity of changeable part Gm being the center of gravity of the position changeable part 84 is positioned between the center of gravity of panel Gp being the center of gravity of the photovoltaic panel 12 and a center of gravity of function part Gcc being the center of gravity of the entirety of the two function parts 90. In addition, for example, the center of gravity of panel Gp, the center of gravity of changeable part Gm, and the center of gravity of function part Gc are aligned along the straight line Li. The straight line Li is a straight line perpendicular to the light receiving surface FL, for example.

It should be noted that the present invention is not limited to the configuration in which one function part 90 is fixed to one function part arm 85, and instead, may adopt a configuration in which a plurality of function parts 90 are fixed to one function part arm 85.

In the first embodiment of the present invention, the function part 90 is electrically connected to the photovoltaic panel 12 and the position changeable part 84, but the present invention is not limited to this configuration. The function part 90 may be electrically connected to either one of the photovoltaic panel 12 and the position changeable part 84, or may be electrically connected to neither of the photovoltaic panel 12 nor the position changeable part 84.

In the first embodiment of the present invention, the entirety of the function part 90 is hidden behind the light receiving surface FL in a plan view in a direction perpendicular to the light receiving surface FL of the photovoltaic panel 12. However, the present invention is not limited to this configuration. A part of the function part 90 may be hidden behind the light receiving surface FL.

In the first embodiment of the present invention, the function part 90 is mounted to the position changeable part 84 via the arm part 87, but the present invention is not limited to this configuration. The function part 90 may be directly mounted to the position changeable part 84, or may be mounted to the position changeable part 84 via a member other than the arm part 87.

In the first embodiment of the present invention, the positional relationship between the function part 90 and the photovoltaic panel 12 is fixed by the arm part 87, but the present invention is not limited to this configuration. For example, a configuration may be adopted in which the function part 90 is mounted to the arm part 87 by being suspended from the arm part 87, and the position of the function part 90 relative to the photovoltaic panel 12 is not fixed while the function part 90 faces the back surface FS of the photovoltaic panel 12.

In the first embodiment of the present invention, the photovoltaic panel 12 has a plate-like shape as a whole, but the present invention is not limited to this configuration. The photovoltaic panel 12 may have another shape as long as the photovoltaic panel 12 has a light receiving surface and a surface on the opposite side to the light receiving surface.

Further, for example, in a case where it is desired to further decrease the temperature of the function part 90, the function part 90 may have a fan or a cooler mounted to the housing thereof. With such a configuration, it is possible to actively cool the function part 90 so as to be able to operate in a stabler manner.

Meanwhile, in the photovoltaic apparatuses described in PATENT LITERATURE 1 and PATENT LITERATURE 2, since the control panel or the control box includes electronic components and the like, there may be cases where the control panel or the control box fails to operate normally due to rise in temperature.

In a case where the photovoltaic apparatus is installed at a location in the northern hemisphere, for example, its control panel is mounted to the side face on the north of the post supporting the photovoltaic panel at a position 1 m to 2 m above the ground, where easy maintenance is ensured and rise in temperature due to direct sunlight and rise in temperature due to radiant heat from the ground are avoided.

However, since the position of the sun observed on the earth changes with time, it is difficult to prevent all day the entirety of the control panel from being exposed to direct sunlight.

In contrast, in the photovoltaic apparatus according to the first embodiment of the present invention, the photovoltaic panel 12 includes the plurality of power generating elements 14 which each generate power corresponding to the amount of received light, and has the light receiving surface FL and the back surface FS positioned on the opposite side of the light receiving surface FL. The function part 90 provides functions regarding the photovoltaic apparatus 101. The function part 90 is provided separately from the photovoltaic panel 12. The position changeable part 84 is provided between the photovoltaic panel 12 and the function part 90, and can change the positions of the photovoltaic panel 12 and the function part 90. The back surface FS of the photovoltaic panel 12 and the function part 90 face each other. The position changeable part 84 can change the positions of the photovoltaic panel 12 and the function part 90 while maintaining the state where the back surface FS of the photovoltaic panel 12 and the function part 90 face each other.

With this configuration, in a case where the light receiving surface FL of the photovoltaic panel 12 is oriented toward the direction of the sun, the function part 90 is positioned on the opposite side to the sun relative to the photovoltaic panel 12, and thus, direct sunlight to the function part 90 is blocked by the photovoltaic panel 12. Moreover, since the function part 90 and the photovoltaic panel 12 are provided away from each other with the position changeable part 84 interposed therebetween, the function part 90 is less likely to be influenced by radiant heat from the photovoltaic panel 12. Accordingly, it is possible to prevent rise in temperature of the function part 90 which may fail to operate normally due to high temperature.

Therefore, in the photovoltaic apparatus according to the first embodiment of the present invention, poor operation due to high temperature can be suppressed and stabler operation can be realized.

In the photovoltaic apparatus according to the first embodiment of the present invention, the entirety of the function part 90 is hidden behind the light receiving surface FL in a plan view in the direction perpendicular to the light receiving surface FL.

With this configuration, in a case where the light receiving surface FL of the photovoltaic panel 12 is oriented toward the direction of the sun, the entirety of the function part 90 receives no direct sunlight from the sun. Thus, rise in temperature of the function part 90 can be further suppressed.

Furthermore, by adopting the configuration where the function part 90 receives no direct sunlight as above, it is possible to decrease the maximum temperature in the housing of the function part 90, from 70° C. to 50° C., for example.

In the photovoltaic apparatus according to the first embodiment of the present invention, the photovoltaic panel 12 and the function part 90 are joined to the position changeable part 84. The center of gravity of the photovoltaic panel 12, i.e., the center of gravity of panel Gp, the center of gravity of the position changeable part 84, i.e., the center of gravity of changeable part Gm, and the center of gravity of the function part 90, i.e., the center of gravity of function part Gc are aligned along one straight line. The center of gravity of changeable part Gm is positioned between the center of gravity of panel Gp and the center of gravity of function part Gc.

This configuration realizes the relationship in which, for example, the moment of force in the photovoltaic panel 12 and the moment of force in the function part 90 with respect to the position changeable part 84 cancel each other. Thus, it is possible to reduce the torque to be generated in the motor that is included in the position changeable part 84 and that is used in order to change the positions of the photovoltaic panel 12 and the function part 90. Accordingly, for example, the motor can be downsized, and the power consumption of the motor and the control circuit of the motor can be reduced.

Moreover, for example, the load applied on gears for transmitting rotation of the motor can be reduced. Thus, occurrence of unnecessary backlash in the position changeable part 84 can be suppressed, and the frequency of maintenance to be performed on the photovoltaic apparatus 101 can be reduced.

In the photovoltaic apparatus according to the first embodiment of the present invention, the distance between the function part 90 and the position changeable part 84 is determined based on the distance between the photovoltaic panel 12 and the position changeable part 84.

With this configuration, for example, the distance between the function part 90 and the position changeable part 84 can be determined such that the moment of force in the function part 90 and the moment of force in the photovoltaic panel 12 with respect to the position changeable part 84 are balanced with each other. Thus, the torque to be generated in the motor mentioned above can be further reduced.

In the photovoltaic apparatus according to the first embodiment of the present invention, the photovoltaic panel 12 and the function part 90 are joined to the position changeable part 84. The ratio of the product of the weight of the function part 90 and the distance between the function part 90 and the joining point at which the function part 90 and the position changeable part 84 are joined together, relative to the product of the weight of the photovoltaic panel 12 and the distance between the photovoltaic panel 12 and the joining point at which the photovoltaic panel 12 and the position changeable part 84 are joined together, is included in the range of not less than ½ and not greater than 2.

In this manner, with the configuration in which the ratio of the moment of force in the function part 90 to the moment of force in the photovoltaic panel 12 with respect to the position changeable part 84 is included in a predetermined range, it is possible to actively use the function part 90 as a counterbalance to the photovoltaic panel 12, thereby being able to substantially realize a state where the moment of force in the photovoltaic panel 12 and the moment of force in the function part 90 are balanced with each other. Accordingly, for example, occurrence of unnecessary backlash in the position changeable part 84 can be suppressed, and thus, the direction of the light receiving surface FL can be controlled in a stabler manner.

In the photovoltaic apparatus according to the first embodiment of the present invention, the arm part 87 is a hollow member. Each member in the arm part 87 connects the position changeable part 84 and the function part 90 with each other, connects the function part 90 and the photovoltaic panel 12 with each other, or connects the photovoltaic panel 12 and the position changeable part 84 with each other. The wire 181 passes through the hollow portion of the arm part 87 and connects the position changeable part 84 and the function part 90 with each other. The wire 180 passes through the hollow portion of the arm part 87 and connects the function part 90 and the photovoltaic panel 12 with each other. The wire 184 passes through the hollow portion of the arm part 87 and connects the photovoltaic panel 12 and the position changeable part 84 with each other.

Thus, with the configuration in which the wires pass through the inside of the arm part 87, for example, it is possible to prevent troubles in which tensile stress is applied on the wires due to mechanical operation of the photovoltaic apparatus 101, resulting in damage of the wires. Moreover, it is possible to reduce a surplus of the wire in length for not allowing the wire to hinder mechanical operation of the photovoltaic apparatus 101. Since the arm part 87 can be used as a protection member for the wires, it is not necessary to separately provide a protection member to the wire.

In the photovoltaic apparatus according to the first embodiment of the present invention, each member in the arm part 87 connects the position changeable part 84 and the function part 90 with each other, connects the function part 90 and the photovoltaic panel 12 with each other, or connects the photovoltaic panel 12 and the position changeable part 84 with each other. The arm part 87 is formed from FRP (fiber reinforced plastics).

With this configuration, it is possible to reduce the weight of the arm part 87 while providing high strength to the arm part 87.

In the photovoltaic apparatus according to the first embodiment of the present invention, each member in the arm part 87 connects the position changeable part 84 and the function part 90 with each other, or connects the function part 90 and the photovoltaic panel 12 with each other. The heat insulating material 95 is provided between the arm part 87 and the function part 90.

With this configuration, heat conduction from the arm part 87 to the function part 90 can be suppressed.

Next, another embodiment of the present invention will be described with reference to the drawings. It should be noted that the same or corresponding parts are denoted by the same reference characters, and description thereof is not repeated.

Second Embodiment

The present embodiment relates to a photovoltaic apparatus having an arm part different from that in the photovoltaic apparatus according to the first embodiment. Except the contents described below, the photovoltaic apparatus according to the present embodiment is the same as the photovoltaic apparatus according to the first embodiment.

Figure 11:
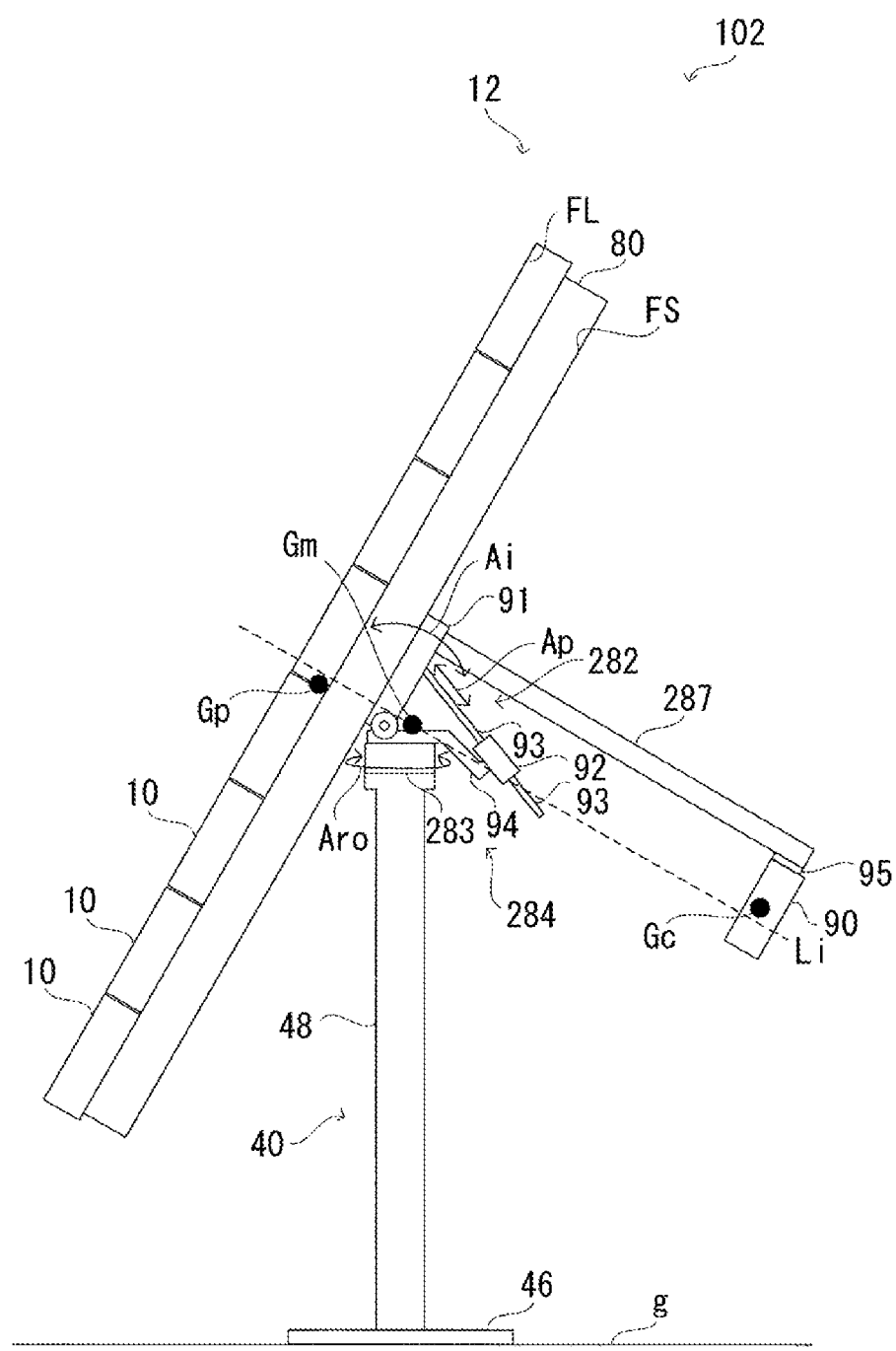
FIG. 11 is a side view of a photovoltaic apparatus according to a second embodiment of the present invention.

FIG. 11 is a side view of a photovoltaic apparatus according to a second embodiment of the present invention.

With reference to FIG. 11, compared with the photovoltaic apparatus 101 according to the first embodiment of the present invention, a photovoltaic apparatus 102 includes a position changeable part 284 instead of the position changeable part 84, and an arm part 287 instead of the arm part 87. The position changeable part 284 includes an elevation drive part 282 and an azimuth drive part 283. The elevation drive part 282 includes a panel fixing plate 91, a rod drive part 92, a push rod 93, and a support part 94.

The photovoltaic panel 12 includes the plurality of power generation modules 10, the sun direction sensor 25 not shown, and the frame part 80. The photovoltaic panel 12 has the light receiving surface FL and the back surface FS. The back surface FS is the surface on the opposite side to the light receiving surface FL of the photovoltaic panel 12.

The position changeable part 284 is provided between the photovoltaic panel 12 and the function part 90. The photovoltaic panel 12 and the function part 90 are joined to the position changeable part 284.

Specifically, the photovoltaic panel 12 is mounted to the panel fixing plate 91 of the position changeable part 284. The function part 90 is mounted to the position changeable part 284 via the arm part 287. The arm part 287 connects the position changeable part 284 and the function part 90 with each other. The position changeable part 284 is mounted to the distal end of the post 48. The arm part 287 may connect the function part 90 and the photovoltaic panel 12 with each other.

The function part 90 is provided separately from the photovoltaic panel 12. Specifically, for example, the function part 90 is provided at a certain distance from the photovoltaic panel 12. The function part 90 faces the back surface FS of the photovoltaic panel 12.

Based on a control signal from the function part 90, the position changeable part 284 operates such that the direction of the light receiving surface FL of the photovoltaic panel 12 tracks the sun, with the direction of the light receiving surface FL oriented toward the sun.

At this time, the position changeable part 284 changes the positions of the photovoltaic panel 12 and the function part 90 while maintaining the state where the function part 90 and the back surface FS face each other.

Specifically, for example, in the elevation drive part 282 of the position changeable part 284, the support part 94 supports the panel fixing plate 91 such that the panel fixing plate 91 can be tilted. The photovoltaic panel 12 is mounted to the panel fixing plate 91. The push rod 93 passes through the inside of the rod drive part 92, and the distal end of the push rod 93 is mounted to the panel fixing plate 91, for example.

The rod drive part 92 is mounted to the support part 94, and pushes the push rod 93 into the direction of the photovoltaic panel 12 or pulls back the push rod 93 from the direction of the photovoltaic panel 12 as indicated by an arrow Ap. In this manner, the rod drive part 92 tilts the panel fixing plate 91 as indicated by an arrow Ai, to drive the photovoltaic panel 12 and the function part 90 in the elevation direction.

The azimuth drive part 283 is provided below the support part 94 of the elevation drive part 282. The azimuth drive part 283 includes a motor, for example, and rotates the elevation drive part 282 in the horizontal direction as indicated by the arrow Aro, thereby to drive the photovoltaic panel 12 and the function part 90 in the azimuth direction.

For example, in a plan view in the direction perpendicular to the light receiving surface FL of the photovoltaic panel 12, the function part 90 is positioned such that the entirety thereof is hidden behind the light receiving surface FL of the photovoltaic panel 12.

The heat insulating material 95 is provided between the arm part 287 and the function part 90, for example, and suppresses heat conduction from the photovoltaic panel 12 to the function part 90.

For example, the center of gravity of changeable part Gm being the center of gravity of the position changeable part 284 is positioned between the center of gravity of panel Gp being the center of gravity of the photovoltaic panel 12 and the center of gravity of function part Gc being the center of gravity of the function part 90. In addition, the center of gravity of panel Gp, the center of gravity of changeable part Gm, and the center of gravity of function part Gc are aligned along the straight line Li. The straight line Li is a straight line perpendicular to the light receiving surface FL, for example.

The arm part 287 is a hollow member, for example. The photovoltaic apparatus 102 includes a wire 182 not shown which passes through the hollow portion of the arm part 287. The wire 182 electrically connects the position changeable part 284 and the function part 90 with each other, for example. A wire that electrically connects the photovoltaic panel 12 and the function part 90 with each other may pass through the hollow portion of the arm part 287, for example.

The wire 182 is a bundle of a plurality of electric wires, for example. It should be noted that the wire 182 may not be formed by a plurality of electric wires, but may be formed by one electric wire. The arm part 287 is formed from FRP, for example.

The other configurations and operation are the same as those of the photovoltaic apparatus according to the first embodiment, and thus, detailed description thereof is not repeated here.

The above embodiments are merely illustrated in all aspects and should not be recognized as being restrictive. The scope of the present invention is defined by the scope of the claims rather than by the description above, and is intended to include meaning equivalent to the scope of the claims and all modifications within the scope.

The above description includes the features in the additional notes below.

[Additional Note 1]

A photovoltaic apparatus including:

a power generation part including a plurality of power generating elements each generating power in accordance with an amount of received light, the power generation part having a light receiving surface and a back surface positioned on an opposite side to the light receiving surface;

a function part provided separately from the power generation part and configured to provide functions regarding the photovoltaic apparatus; and a position changeable part provided between the power generation part and the function part and capable of changing positions of the power generation part and the function part, wherein the back surface of the power generation part and the function part face each other, the position changeable part is capable of changing the positions of the power generation part and the function part while maintaining a state where the back surface of the power generation part and the function part face each other, the power generation part has a plate-like shape as a whole, the position changeable part is capable of changing positions of the power generation part and the function part such that the light receiving surface faces the direction of the sun, and the function part includes a housing and is mounted such that the widest face in the housing is in parallel with the back surface of the power generation part.

[Additional Note 2]

A photovoltaic apparatus configured to cause a photovoltaic panel to perform operation of tracking the sun, the photovoltaic apparatus including:

a position changeable part configured to change a position of the photovoltaic panel so as to cause the photovoltaic panel to perform the tracking operation; and a function part having a housing accommodating electronic components therein, the function part being in an area where sunlight is blocked irrespective of the position of the photovoltaic panel, by the function part being supported so as to be moved in conjunction with the photovoltaic panel, and by the function part being in an area where sunlight is blocked by the photovoltaic panel, the area being on a back surface side opposite to a light receiving surface of the photovoltaic panel.

REFERENCE SIGNS LIST

10 power generation module
12 photovoltaic panel (power generation part)
13 housing
14 power generating element
15 flexible printed circuit
16 Fresnel lens
17 light receiving part
18 conductive part
25 sun direction sensor
40 pedestal
46 base
48 post
80 frame part
81 panel arm
82, 282 elevation drive part
83, 283 azimuth drive part
84, 284 position changeable part
85 function part arm
86 arm connection part
87, 187, 287 arm part
88 joining point
89 panel arm
90 function part
91 panel fixing plate
92 rod drive part
93 push rod
94 support part
95 heat insulating material
100, 101, 102 photovoltaic apparatus
180, 181, 182, 184 wire
183 hollow portion
FL light receiving surface
FS back surface
Fo main surface
Gc, Gcc center of gravity of function part
Gm center of gravity of changeable part
Gp center of gravity of panel
g ground

The invention claimed is:

1. A photovoltaic apparatus configured to cause a photovoltaic panel to perform operation of tracking the sun, the photovoltaic apparatus comprising:

a position changeable part configured to change a position of the photovoltaic panel so as to cause the photovoltaic panel to perform the tracking operation; and a function part, which has a housing accommodating electronic components therein, located in an area of a back surface side opposite to a light receiving surface of the photovoltaic panel where sunlight is blocked, the function part being supported by an arm extending away from the back surface side whereby a relative positional relation between the function part and the photovoltaic panel is fixed via the arm, wherein the arm includes an arm part which is hollow, wherein with respect to a direction perpendicular to the light receiving surface, a moment of the photovoltaic panel by gravity centering on the position changeable part and a moment of the function part by gravity centering on the position changeable part are configured to act in reverse directions to each other, and a wire passing through a hollow portion of the arm part, the wire connecting the position changeable part and the function part with each other, connecting the function part and the photovoltaic panel with each other, or connecting the photovoltaic panel and the position changeable part with each other.

2. The photovoltaic apparatus according to claim 1, wherein
in a plan view in a direction perpendicular to the light receiving surface, an entirety of the function part is hidden behind the light receiving surface.

3. The photovoltaic apparatus according to claim 1, wherein
the photovoltaic panel and the function part are joined to the position changeable part, and
a center of gravity of the photovoltaic panel, a center of gravity of the position changeable part, and a center of gravity of the function part are aligned along one straight line, and the center of gravity of the position changeable part is positioned between the center of gravity of the photovoltaic panel and the center of gravity of the function part.

4. The photovoltaic apparatus according to claim 1, wherein
a distance between the function part and the position changeable part is determined based on a distance between the photovoltaic panel and the position changeable part.

5. The photovoltaic apparatus according to claim 1, wherein
the photovoltaic panel is joined to the position changeable part at a first joining point, and
the function part is joined to the position changeable part at a second joining point, and
positions and weights of the photovoltaic panel and the function part are set so as to have a relationship:

$$\tfrac{1}{2} \leq (Lp \times Wp)/(Ls \leq Ws) \leq 2$$

wherein
Lp is a distance from the first joining point to the photovoltaic panel,
Wp is a weight of the photovoltaic panel,
Ls is a distance from the second joining point to the function part, and
Ws is a weight of the function part.

6. The photovoltaic apparatus according to claim 1, wherein
the arm part is formed from FRP (fiber reinforced plastics).

7. The photovoltaic apparatus according to claim 1, further comprising a heat insulating material provided between an end of the arm and the function part.

8. The photovoltaic apparatus according to claim 1, wherein the electronic components include at least one of: a connection box which connects wires with each other, a power conditioner which converts direct-current power to alternating-current power, a monitoring circuit for displaying an operation state of the photovoltaic apparatus, a safety circuit, a measuring device and a data logger.

* * * * *

UNITED STATES PATENT AND TRADEMARK OFFICE
CERTIFICATE OF CORRECTION

PATENT NO.       : 10,560,051 B2
APPLICATION NO.  : 15/519709
DATED            : February 11, 2020
INVENTOR(S)      : Takashi Iwasaki et al.

It is certified that error appears in the above-identified patent and that said Letters Patent is hereby corrected as shown below:

In the Claims

In Claim 5, Column 20, Line 15, "$1/2 \leq (Lp \times Wp) / (Ls \leq Ws) \leq 2$" should read
--$1/2 \leq (Lp \times Wp) / (Ls \times Ws) \leq 2$--.

Signed and Sealed this
Tenth Day of November, 2020

Andrei Iancu
*Director of the United States Patent and Trademark Office*